United States Patent
Eastlake, III

(10) Patent No.: US 12,095,660 B2
(45) Date of Patent: Sep. 17, 2024

(54) METHOD FOR MULTI-SEGMENT FLOW SPECIFICATIONS

(71) Applicant: Futurewei Technologies, Inc., Plano, TX (US)

(72) Inventor: Donald E. Eastlake, III, Apopka, FL (US)

(73) Assignee: Futurewei Technologies, Inc., Addison, TX (US)

(*) Notice: Subject to any disclaimer, the term of this patent is extended or adjusted under 35 U.S.C. 154(b) by 0 days.

(21) Appl. No.: 17/114,297

(22) Filed: Dec. 7, 2020

(65) Prior Publication Data

US 2021/0258251 A1 Aug. 19, 2021

Related U.S. Application Data

(60) Provisional application No. 62/975,897, filed on Feb. 13, 2020.

(51) Int. Cl.
*H04L 45/00* (2022.01)
*H04L 45/24* (2022.01)
*H04L 45/74* (2022.01)

(52) U.S. Cl.
CPC .............. *H04L 45/38* (2013.01); *H04L 45/24* (2013.01); *H04L 45/566* (2013.01); *H04L 45/74* (2013.01)

(58) Field of Classification Search
CPC ........ H04L 45/74; H04L 45/24; H04L 45/566
USPC ....................................................... 709/238
See application file for complete search history.

(56) References Cited

U.S. PATENT DOCUMENTS

| 9,167,501 | B2 * | 10/2015 | Kempf | ................ H04L 12/4633 |
| 2005/0163122 | A1 * | 7/2005 | Sahni | ...................... H04L 45/50 |
| | | | | 370/392 |
| 2011/0280137 | A1 * | 11/2011 | Bockwoldt | ............. H04L 43/16 |
| | | | | 370/252 |
| 2012/0207170 | A1 * | 8/2012 | Patel | ................... H04L 12/4633 |
| | | | | 370/395.53 |

(Continued)

FOREIGN PATENT DOCUMENTS

| WO | WO-2014002455 A1 * | 1/2014 | ............. H04L 45/38 |
| WO | WO-2014002481 A1 * | 1/2014 | ............. H04L 45/22 |

OTHER PUBLICATIONS

Byte Segment Neural Network for Network Traffic Classification Rui Li;Xi Xiao; Shiguang Ni; Haitao Zheng;Shutao Xia 2018 IEEE/ACM 26th International Symposium on Quality of Service (IWQoS) Year: 2018 | Conference Paper | Publisher: IEEE (Year: 2018).*

(Continued)

*Primary Examiner* — Jeffrey R Swearingen
(74) *Attorney, Agent, or Firm* — Conley Rose, P.C.

(57) ABSTRACT

A method performed by a network node for identifying packet flows. The method includes receiving, by the network node, a packet. The method includes determining by the network node whether data contained in the packet matches all segments of a multi-segment flow specification (spec). In this context, a given packet is said to match the defined flow when attributes of the packet match all the specified criteria of a particular BGP FlowSpec. The method includes processing by the network node the packet according to an action specified in the multi-segment flow spec when the data contained in the packet matches all segments of the multi-segment flow spec.

20 Claims, 4 Drawing Sheets

(56) References Cited

U.S. PATENT DOCUMENTS

| | | | | |
|---|---|---|---|---|
| 2013/0282760 | A1* | 10/2013 | Pendse | G06F 16/21 |
| | | | | 707/E17.014 |
| 2016/0035183 | A1* | 2/2016 | Buchholz | G07F 17/3225 |
| | | | | 463/25 |
| 2017/0063668 | A1* | 3/2017 | Sivasankar | H04L 45/18 |
| 2017/0063783 | A1* | 3/2017 | Yong | H04L 69/22 |
| 2017/0064039 | A1* | 3/2017 | Shen | H04L 45/306 |
| 2019/0036822 | A1* | 1/2019 | Zhuang | H04L 45/04 |
| 2019/0104060 | A1* | 4/2019 | Wang | H04L 45/22 |
| 2020/0244780 | A1* | 7/2020 | Peled | H04L 69/16 |
| 2020/0328971 | A1* | 10/2020 | Bashandy | H04L 45/74 |
| 2021/0314267 | A1* | 10/2021 | Iwasawa | H04L 47/6215 |

OTHER PUBLICATIONS

Near optimal flow labeling in ATM/IP-LSR networks using multi-segment flows A. Harwood;H. Shen Proceedings IEEE International Conference on Networks 2000 (ICON 2000). Networking Trends and Challenges in the New Millennium (Year: 2000).*

Segment Routing in multi-layer networks P. Castoldi;A. Giorgetti;A. Sgambelluri;F. Paolucci;F. Cugini 2017 19th International Conference on Transparent Optical Networks (ICTON) Year: 2017 | Conference Paper | Publisher: IEEE (Year: 2017).*

Byte Segment Neural Network for Network Traffic Classification Rui Li;Xi Xiao; Shiguang Ni;Haitao Zheng;Shutao Xia 2018 IEEE/ACM 26th International Symposium on Quality of Service (IWQoS) Year: 2018 | Conference Paper | Publisher: IEEE (Year: 2018) (Year: 2018).*

IPv6 over ATM flow-handling 1998 1st IEEE International Conference on ATM. ICATM'98 (pp. 439-446) Loukola, M.V. (Year: 1998).*

Hao, et al., "BGP Dissemination fo L2 Flow Specification Rules," draft-ietf-idr-flowspec-l2vpn-13, Dec. 31, 2019, 25 pages.

Eastlake, et al., "BGP Dissemination of Flow Specification Rules for Tunneled Traffic," draft-ietf-idr-flowspec-nvo3-07, Nov. 4, 2019, 20 pages.

Eastlake, et al., "BGP Dissemination of Flow Specification Rules for Tunneled Traffic," draft-ietf-idr-flowspec-nvo3-08, Jan. 16, 2020, 21 pages.

Rekhter, Ed., et al, "A Border Gateway Protocol 4 (BGP-4)," RFC 4271, Jan. 2006, 104 pages.

Marques, et al, "Dissemination of Flow Specification Rules," RFC 5575, Aug. 2009, 22 pages.

Bates, T., et al., "Multiprotocol Extensions for BGP-4," Network Working Group, RFC 4760, Jan. 2007, 12 pages.

Eastlake, D., "BGP Dissemination of Network Virtualization Overlays (NVO3) Flow Specification Rules," draft-ietf-dr-flowspec-nvo3-06, Jul. 8, 2019, 23 pages.

Hares, S., et al., "Dissemination of Flow Specification Rules," draft-ietf-idr-rfc5575bis-06, IDR Working Group, Oct. 24, 2017, 33 pages.

Loibl, C., Ed., et al., "Dissemination of Flow Specification Rules for IPv6, "Internet Engineering Task Force (IETF), RFC 8956, Dec. 2020, 19 pages.

Iana, "The MIB module defines the AddressFamilyNumbers textual convention," Internet Assigned Numbers Authority, Internet Corporation for Assigned Names and Numbers, Nov. 4, 2019, 3 pages.

* cited by examiner

METHOD FOR MULTI-SEGMENT FLOW SPECIFICATIONS

CROSS-REFERENCE TO RELATED APPLICATIONS

This application claims priority to U.S. provisional patent application No. 62/975,897, filed Feb. 13, 2020, by Donald E. Eastlake, III, and titled "Method for Multi-Segment Flow Specifications," which is incorporated by reference.

TECHNICAL FIELD

The present application relates to network communication, and more specifically to systems and methods for multi-segment flow specs.

BACKGROUND

Information being communicated through a packet switched network, including through the Internet, is frequently classified into "flows" so that different types of information or information being communicated for different clients or the like can be handled in different ways or separately metered. For the concept of a "flow" to be useful, there must be some way to identify whether a packet is or is not a part of that flow, either by some explicit label on each packet or through the value of various already existing fields in the packet header or headers or the like.

Border gateway protocol (BGP) is a protocol for communicating routing and control information between a pair of network stations. BGP protocol network is usually deployed and operated in such a way as to build a network of more than two stations to support distribution of the communicating, routing and control information. BGP flow specification (BGP FlowSpec), defined in RFC5575bis, which is incorporated in its entirety herein, is an extension to BGP that supports the dissemination of traffic flow specification rules. BGP FlowSpec uses the BGP control plane to simplify the distribution of Access Control Lists (ACLs) and allows new filter rules to be injected to all BGP peers simultaneously without changing router configuration. A typical application of BGP FlowSpec is to automate the distribution of traffic filter lists to routers for distributed denial of service (DDoS) mitigation. A DDoS attack is one which tries to disable a network or disable one or more stations on a network primarily by sending an overwhelming volume of traffic to that network or those stations. BGP FlowSpec defines a BGP Network Layer Reachability Information (NLRI) format used to distribute traffic flow specification rules (i.e., a specific flow format) to the border routers instructing them to create a sort of ACL to implement certain rules. All previous BGP FlowSpecs matched only a single level of Internet Protocol (IP)/Ethernet information fields such as source/destination IP prefix, protocol type, source/destination media access control (MAC), and ports.

SUMMARY

A first aspect relates to a method performed by a network node for identifying packet flows. The method includes receiving, by the network node, a packet. The method includes determining by the network node whether data contained in the packet matches all segments of a multi-segment flow specification (spec). In this context, a given packet is said to match the defined flow when attributes of the packet match all the specified criteria of a particular flow spec. The method includes processing by the network node the packet according to an action specified in the multi-segment flow spec when the data contained in the packet matches all segments of the multi-segment flow spec. One such action is dropping the packet (i.e., not forwarding the packet) when the data contained in the packet matches all segments of the multi-segment flow spec.

A second aspect relates to an apparatus that includes a receiver configured to receive a packet, a memory storing instructions, and a processor coupled to the memory and the receiver. The processor is configured to execute the instructions to cause the apparatus to determine whether data contained in the packet matches all segments of a multi-segment flow spec, and process the packet according to an action specified in the multi-segment flow spec when the data contained in the packet matches all segments of the multi-segment flow spec.

The first and second aspects enable flows to be recognized by testing multiple header fields such as a Layer 2 header field in addition to Layer 3 protocol headers, whereas existing standardized flow specs such as BGP FlowSpecs are limited to testing only one layer of header such as IP version 4 (IPv4) Layer 3 headers or Ethernet Layer 2 headers, but not both.

Optionally, in any of the preceding aspects, another implementation of the aspect provides that each segment in the multi-segment flow spec is associated with a segment type identifier.

Optionally, in any of the preceding aspects, another implementation of the aspect provides receiving, by the network node, a plurality of flow specs from a flow spec controller; and storing, by the network node, the plurality of flow specs in a data table.

Optionally, in any of the preceding aspects, another implementation of the aspect provides iterating, by the network node, the plurality of flow specs in order of precedence.

Optionally, in any of the preceding aspects, another implementation of the aspect provides retrieving, by the network node, a segment type identifier for a first segment of the multi-segment flow spec; determining, by the network node, whether the segment interpreted under the segment type identifier match a corresponding first portion of the packet; retrieving, by the network node, a second segment type identifier for a second segment of the multi-segment flow spec; and determining, by the network node, whether the second segment interpreted under the second segment type identifier match a corresponding second portion of the packet.

Optionally, in any of the preceding aspects, another implementation of the aspect provides processing, by the network node, the packet according to a forwarding process when the packet does not match any of the plurality of flow specs.

Optionally, in any of the preceding aspects, another implementation of the aspect provides that the segment type identifier is an Address Family Identifier (AFI).

Optionally, in any of the preceding aspects, another implementation of the aspect provides that segment type identifiers for the multi-segment flow spec are specified within a corresponding segment of the multi-segment flow spec.

Optionally, in any of the preceding aspects, another implementation of the aspect provides that the segment type identifiers for the multi-segment flow spec are specified in external portions of the multi-segment flow spec outside of the corresponding segments of the multi-segment flow spec.

Optionally, in any of the preceding aspects, another implementation of the aspect provides that the segment type identifiers for the multi-segment flow spec are located at an end of a corresponding segment of the multi-segment flow spec.

Optionally, in any of the preceding aspects, another implementation of the aspect provides that the segment type identifiers for the multi-segment flow spec are located at a beginning of the multi-segment flow spec.

Optionally, in any of the preceding aspects, another implementation of the aspect provides that the action is to drop the packet.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
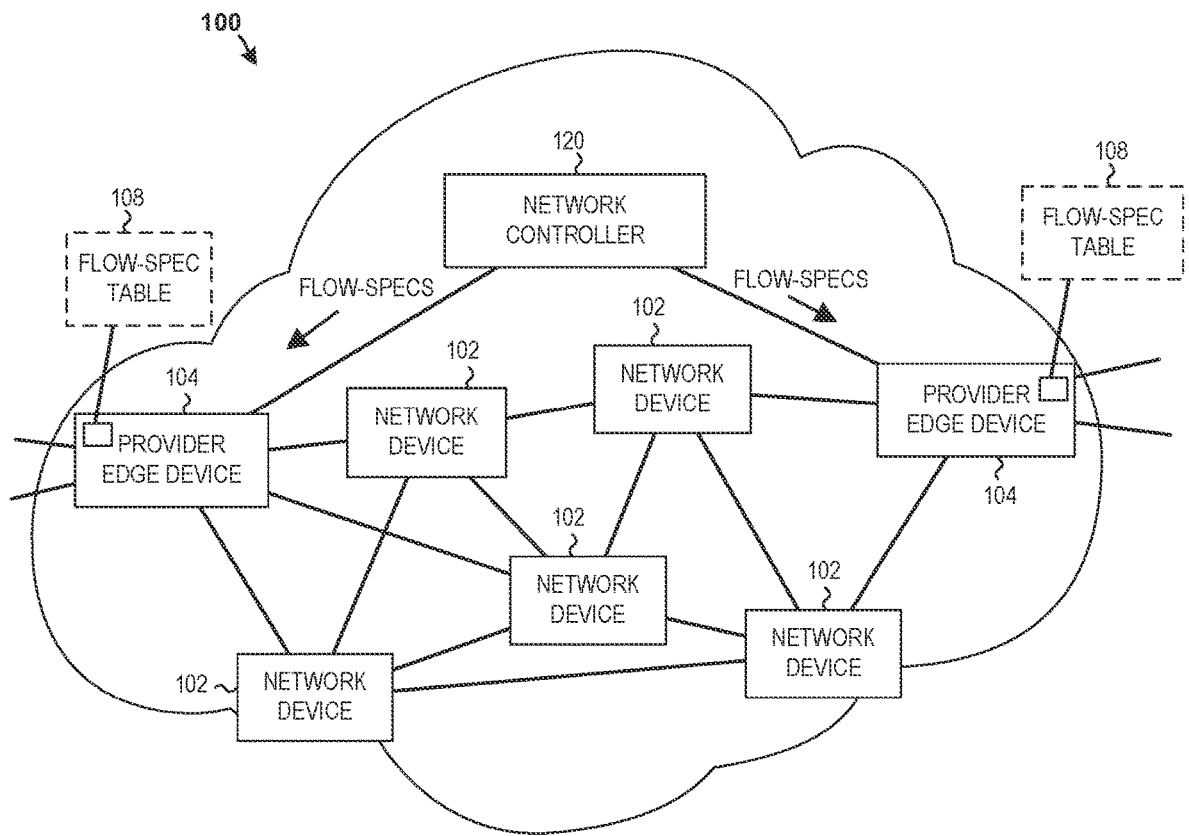
FIG. 1 is a network diagram illustrating an example of a network according to an embodiment of the present disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides systems and methods for encoding and identifying multi-segment flow specs. One advantage of the disclosed embodiments is that they can be used to recognize flows by testing multiple headers possibly at different layers (e.g., a Layer 2 inner header field in addition to Layer 3 outer header).

A flow specification is an n-tuple consisting of several matching criteria that can be applied to traffic (i.e., data packet flows). The matching criteria can include elements such as source and destination address prefixes, IP protocol, and transport protocol port numbers. A given flow may be associated with a set of attributes, depending on the particular application. A particular application is identified by a specific Address Family Identifier/Subsequent Address Family Identifier (AFI/SAFI) pair and corresponds to a distinct set of Routing Information Bases (RIBs). A given Internet Protocol (IP) packet is said to match the defined flow if the IP packet matches all the specified criteria. One example of a flow spec is BGP FlowSpec, which is used to communicate rules to classify packets into flows and to specify actions on such packets. Such action may include enabling the network device to forward traffic according to IP prefixes as well as to classify, shape, rate limit, filter (e.g., drop the packet), or redirect packets. As an example, a BGP FlowSpec can be quickly distributed to a community of stations to allow them to recognize DDoS traffic and discard or otherwise dispose the DDoS traffic. BGP FlowSpec can also be used for other purposes such as generating, determining or sharing Access Control Lists (ACLs).

Existing standardized BGP FlowSpecs are limited to testing IPv4 Layer 3 headers in one embodiment. For instance, the BGP FlowSpec as described in Request for Comments (RFC) 5575 provides for the specification of the flow by means of a sequence of "components" that match or test field values or control bits in packet headers at Layer 3 for IPv4. This is also being extended for IP version 6 and extended for Layer 2 Ethernet headers. However, there are cases where it would be helpful to recognize flows by testing a Layer 2 header field in addition to Layer 3 protocol headers (i.e., the inner header as well as the outer header) or other combinations of two or more sequential headers for a single FlowSpec. For example, there are instances where it could be useful to test two Layer 3 protocol headers in a row such as, but not limited to, for IP-in-IP encapsulation, Generic Routing Encapsulation (GRE), or other tunneled traffic. A tunnel is a mechanism commonly used to hide the inner headers. Tunneling protocols allow the network to use, for example, IP to send another protocol in the "data" portion of the IP datagram. There could also be other instances where the BGP FlowSpec needs to test/match multiple headers, which may be at different layers or use different addressing types, such as in Ethernet virtual private networks (VPNs). Thus, the present disclosure describes various systems and methods that provide a multi-segment flow specs that can be used to test multiple sequential headers of a packet, even when those sequential headers are at different layers.

FIG. 1 is a network diagram illustrating an example of a network 100 according to an embodiment of the present disclosure. In an embodiment, the network 100 is controlled or under the management of a single network provider. The network 100 includes a plurality of network devices 102 including one or more network provider edge devices 104. The network devices 102 may be configured to route data packets across various network paths in the network 100. The provider edge devices 104 are border routers that are located on the edge of the network 100. The provider edge devices 104 connect the network 100 to external networks or devices outside of the network 100 such as the other private networks or public networks, which may include the Internet.

In an embodiment, the network 100 includes a network controller 120 configured to monitor and/or manage the network 100. In an embodiment, the network controller 120 is a BGP FlowSpec controller that creates a BGP FlowSpec NRLI that defines the attributes of a flow. For example, the BGP FlowSpec NRLI may define the attributes of a flow associated with a DDOS attack. In an embodiment, the network controller 120 distributes the BGP FlowSpec NRLI to one or more BGP FlowSpec clients such as the provider edge devices 104. The provider edge device 104 receives the BGP FlowSpec NRLI and installs/programs its hardware to act on the instructions from the network controller 120. In an embodiment, the provider edge device 104 maintains a BGP FlowSpec NRLI table 108 containing a plurality of BGP FlowSpec NRLIs (or BGP FlowSpecs), each defining a particular flow. Using the BGP FlowSpec NRLI table 108, the provider edge device 104 can monitor for packets that match a particular BGP FlowSpec NRLI, and take action (e.g., drop the packet) when a match is found. In some embodiments, any network router or network device 102 can be configured as a BGP FlowSpec client.

Figure 2:
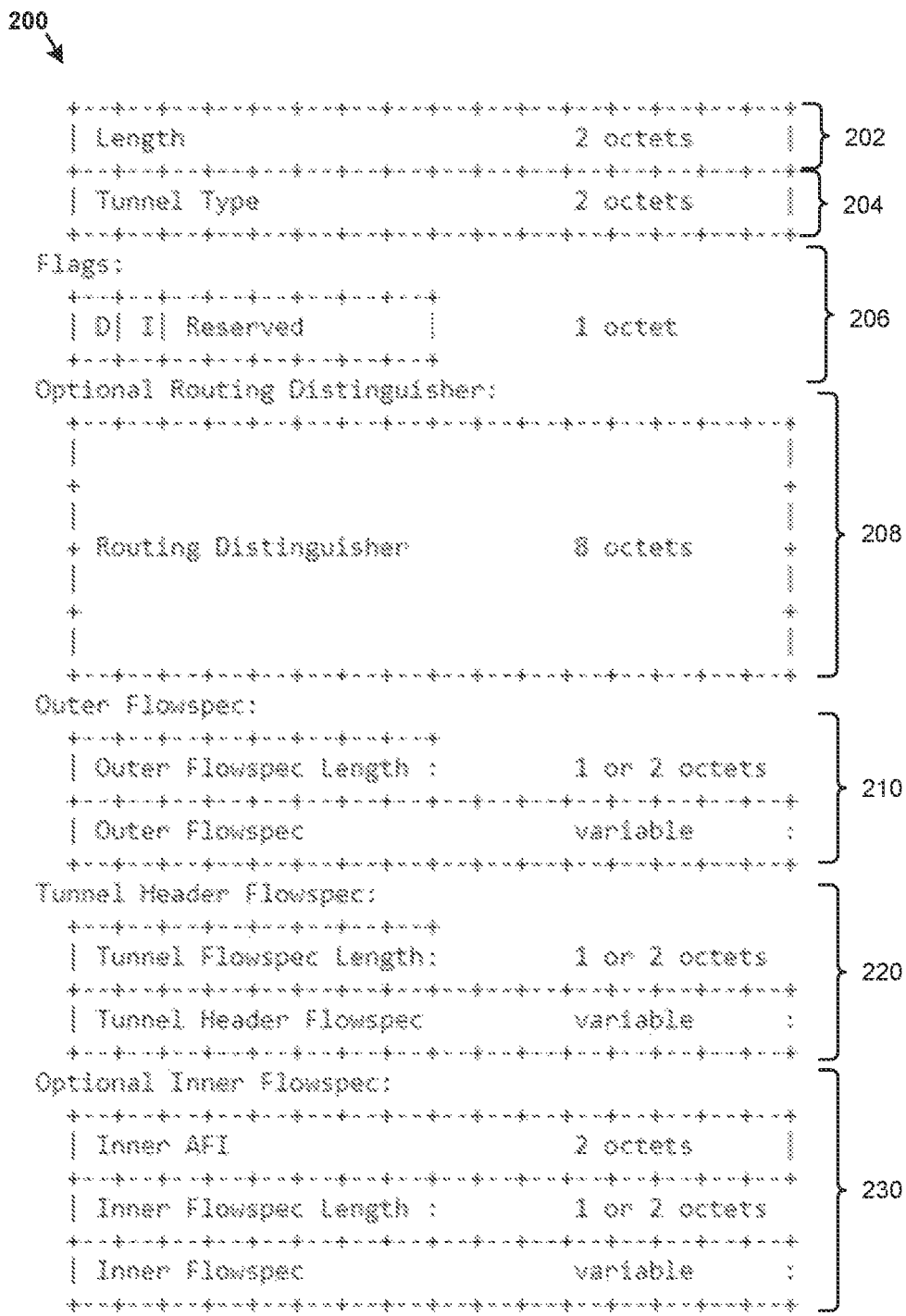
FIG. 2 is a diagram illustrating an example of a multi-segment flow spec encoding that can be used to distribute traffic flow specifications in accordance with an embodiment of the present disclosure.

FIG. 2 is a diagram illustrating an example of a multi-segment flow spec encoding 200 that can be used to distribute traffic flow specifications in accordance with an embodiment of the present disclosure. In an embodiment, the multi-segment flow spec encoding 200 is referred to as a Tunneled Traffic FlowSpec NLRI because it enables flow specification of tunneled traffic. The multi-segment flow spec encoding 200 can be encoded within a packet along with other data (not shown in FIG. 2) such as header information (e.g., destination prefix, source prefix, protocol, ports, etc.) and additional BGP multiprotocol attributes (e.g., MP_REACH_NLRI and MP_UNREACH_NLRI as defined in RFC 4760). A segment is defined as a group or set of flow spec criteria that is associated with a segment type identifier such as, but not limited to, an AFI. In an embodiment, the multi-segment flow spec encoding 200 enables matching of multi-layer header flows.

In the depicted embodiment, the multi-segment flow spec encoding 200 includes a length field 202, a tunnel type field 204, flag fields 206, an optional routing distinguisher field 208, and three flow spec segments: an outer FlowSpec segment 210, a tunnel header FlowSpec segment 220, and an optional inner FlowSpec segment 230. The length field 202 specifies the length of the NLRI including the tunnel type field 204, which is encoded as an unsigned integer. The tunnel type field 204 specifies the type of tunnel using a value from the Internet Assigned Numbers Authority (IANA) BGP Tunnel Encapsulation Attribute Tunnel Types registry. The flag fields 206 include a D bit field, an I bit field, and reserved bits that are reserved for future use. In an embodiment, the D bit field is used to indicate the presence of a routing distinguisher in the optional routing distinguisher field 208. The optional routing distinguisher field 208 is used to support traffic filtering within a virtual private network (VPN) when the outer Layer 3 address belongs to a BGP/Multiprotocol Label Switching (MPLS) VPN. The I bit field is used to indicate the presence of the inner segment type identifier such as an AFI and the optional inner FlowSpec segment 230.

The outer FlowSpec segment 210 is the flow specification for the outer header. The outer FlowSpec segment 210 includes an outer FlowSpec length field 212 and an outer FlowSpec field 214. The outer FlowSpec length field 212 specifies the length of the outer FlowSpec field 214 and is encoded using one or two bytes depending on the size of the length value of the outer FlowSpec field 214. The outer FlowSpec field 214 contains the criteria of the outer FlowSpec segment 210. The criteria of the outer FlowSpec can include elements such as, but not limited, source and destination address prefixes, network layer protocol, and transport protocol port numbers. In an embodiment, the segment type identifier for the outer FlowSpec field 214 is specified in other parts of the packet (not depicted) containing the multi-segment flow spec encoding 200. For example, in an embodiment, an AFI for the outer FlowSpec field 214 is specified in a BGP multiprotocol MP_REACH_NLRI attribute as defined in RFC 4760 and is contained in the same packet as the multi-segment flow spec encoding 200.

The tunnel header FlowSpec segment 220 is the flow specification for the tunneling header. The tunnel header FlowSpec segment 220 can specify matching criterion on tunnel header fields. The tunnel type is indicated by the tunnel type field 204. The tunnel header FlowSpec segment 220 includes a tunnel FlowSpec length field 222 a tunnel header FlowSpec field 224. The tunnel FlowSpec length field 222 specifies the length of the tunnel header FlowSpec field 224 and is encoded using one or two bytes depending on the size of the length value of the tunnel header FlowSpec field 224. The tunnel header FlowSpec field 224 contains the criteria of the tunnel header FlowSpec segment 220. For some types of tunneling, such as IP-in-IP, there may be no tunnel header fields. For other types of tunneling, there may be several tunnel header fields on which matching could be specified.

The optional inner FlowSpec segment 230 is the flow specification for the header level encapsulated within the outer header and, if present, the tunnel header (i.e., inner nested header information). The optional inner FlowSpec segment 230 includes an inner segment type identifier field such as an inner AI field 232, an inner FlowSpec length field 234, and an inner FlowSpec field 236. The inner AFI field 232 specifies the segment type or address family identifier for the inner flow spec. The inner FlowSpec length field 234 specifies the length of the inner FlowSpec field 236 and is encoded using one or two bytes depending on the size of the length value of the inner FlowSpec field 236. The inner FlowSpec field 236 contains the criteria of the inner FlowSpec. The criteria of the inner FlowSpec can include elements such as, but not limited, source and destination address prefixes, network layer protocol, and transport protocol port numbers.

In an alternative embodiment, the segment type identifier or inner AFI field 232 may be specified in another portion of the packet (e.g., with the AFI of the outer FlowSpec). Similarly, in some embodiments the type and length fields of the outer FlowSpec segment 210 and the optional inner FlowSpec segment 230 may be specified in other portions of the packet (e.g., all AFIs, type, and length can be extracted in placed in front of the packet).

As discussed above, the multi-segment flow spec encoding 200 can be used to specify a flow spec such as a BGP FlowSpec that can be used to match multiple sequential headers of a packet, which may be at different layers. For example, in an embodiment, the outer FlowSpec segment 210 is used for matching a Layer 3 header, and the optional inner FlowSpec segment 230 is used for matching a Layer 2 header. This can be useful for recognizing certain types of data packets that may cause network issues such as packets associated with a denial of service attack or other types of packet flows.

Figure 3:
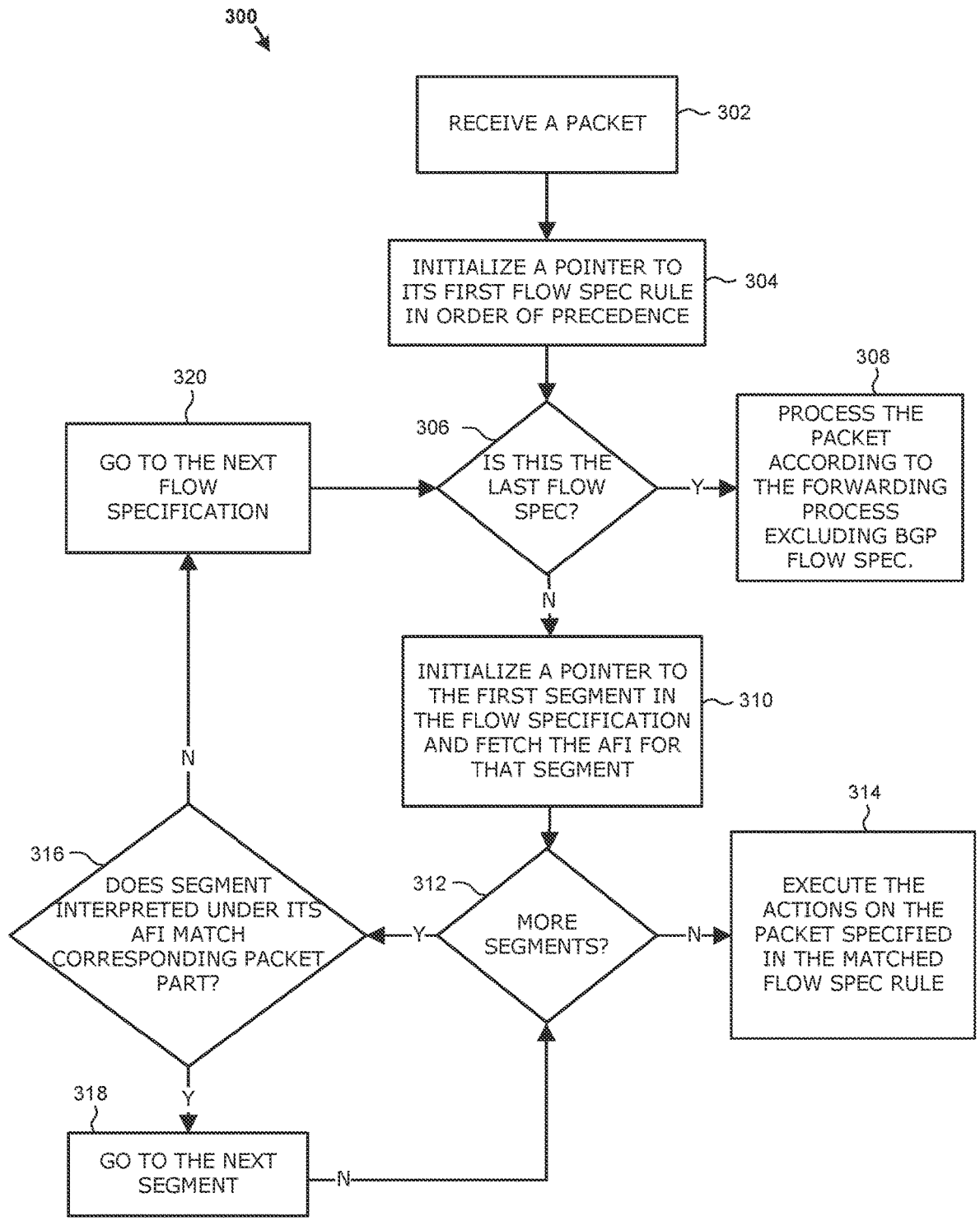
FIG. 3 is a flowchart illustrating a method performed by a network node for identifying and processing packets that match a multi-segment flow spec in accordance with an embodiment of the present disclosure.

FIG. 3 is a flowchart illustrating a method 300 for identifying and processing packets that match a multi-segment flow spec in accordance with an embodiment of the present disclosure. The method 300 can be executed by any network node such as, but not limited to, a network edge device 104 in FIG. 1. Although the below description references BGP FlowSpec, the method 300 can be applied to any type of multi-segment flow spec. In an embodiment, the network node executing the method 300 has implemented BGP FlowSpec (i.e., been configured to recognize packets based on the BGP FlowSpec) and has received and stored/ installed one or more BGP FlowSpec NLRIs (e.g., has a BGP FlowSpec NRLI table 108). Every BGP FlowSpec NLRI is effectively a rule, consisting of a matching part (encoded in the NLRI field) and an action part comprising one or more actions (encoded as a BGP extended community). Once the BGP FlowSpec NLRIs are installed, the network node is able to perform a lookup to determine whether incoming traffic matches the defined flows and then take suitable action. In an embodiment, a given packet is said to match the defined flow when attributes of the packet match all the specified criteria of a particular flow spec.

The method 300 begins with the network node receiving a packet at step 302. In an embodiment, the network node executes the method 300, at step 304, to initialize a pointer to the first BGP FlowSpec rule in order of precedence of the BGP FlowSpec NLRIs that are installed on the network node. The pointer references a location in memory where the first BGP FlowSpec rule in order of precedence can be found. At step 306, the network node executes the method 300 to initialize a pointer to the first segment in the BGP FlowSpec and retrieve the AFI or other segment type identifier for the first segment. As described above, each segment is associated with a segment type identifier or type label for each segment. In certain embodiments, there can be more than one segment with the same segment type identifier. For example, IPv4-in-IPv4 encapsulation could have two segments with the IPv4 type. In an embodiment, the first segment could be the outer BGP FlowSpec segment 210 in FIG. 2. As stated above, the AFI or segment type identifier for the segment may be located in other portions of the data packet or may be located within the corresponding segment in the BGP FlowSpec. At step 308, the network node executes the method 300 to determine whether the segment interpreted under its type, for example an AFI, matches the corresponding packet part. The type defines the BGP FlowSpec component. When the segment interpreted under its segment type identifier matches the corresponding packet part, the network node executes the method 300, at step 310, to determine whether there are more segments in the BGP FlowSpec. When there are more segments in the BGP FlowSpec, the network node executes the method 300, at step 312, to proceed to the next segment of the BGP FlowSpec, and to determine, at step 308, whether the next segment interpreted under its segment type identifier matches the corresponding packet part. The network node repeats this process until either the segment interpreted under its segment type identifier does not match the corresponding packet part or there are no more segments to process. When there are no more segments to process, and all segments in the BGP FlowSpec interpreted under their segment type identifier match the corresponding packet part, then the network node executes the method 300, at step 314, to process the packet according to one or more flow spec rule actions specified in the matched BGP FlowSpec rule. Such actions may include enabling the network device to forward traffic (i.e., packets of the packet flow) according to IP prefixes as well as to classify, shape, rate limit, filter (e.g., drop the packets), or redirect the packets.

If at any point, the network node determines that the segment interpreted under its segment type identifier, for example an AFI, does not match the corresponding packet part, the network node executes the method 300, at step 316, to determine whether the current BGP FlowSpec is the last BGP FlowSpec installed at the network node (i.e., whether there's more BGP FlowSpecs to check). If the current BGP FlowSpec is not the last BGP FlowSpec, the network node executes the method 300, at step 318, to proceed to the next BGP FlowSpec rule in order of precedence of the BGP FlowSpec NLRIs that are installed on the network node, and repeats the method 300, at step 306, for the next BGP FlowSpec rule. When the network node determines (e.g., at step 316 of the method 300) that the current BGP FlowSpec is the last BGP FlowSpec, meaning no BGP FlowSpec rules match the packet, the network node executes the method 300, at step 320, to process the packet according to the forwarding process excluding the BGP FlowSpec, and the network node terminates the method 300 thereafter.

Figure 4:
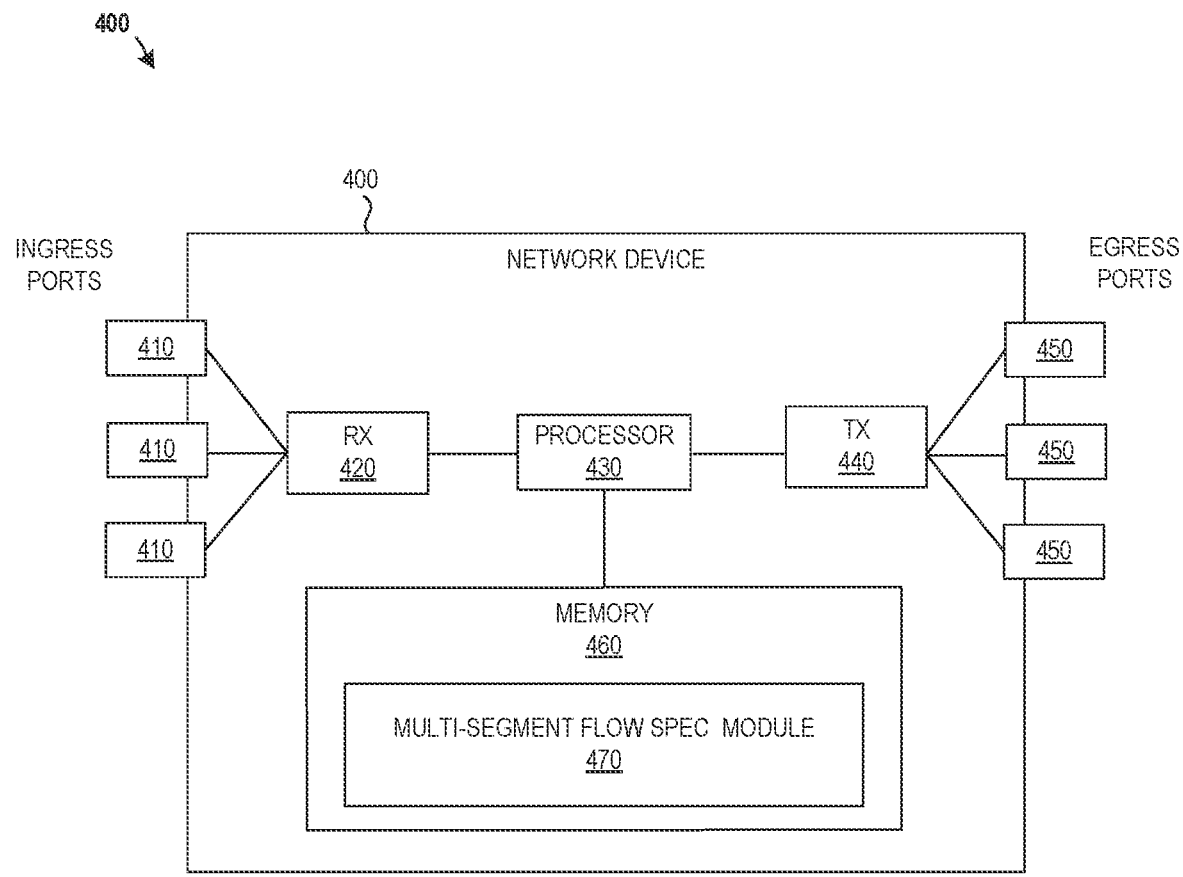
FIG. 4 is a schematic diagram illustrating a network device according to an embodiment of the present disclosure.

FIG. 4 is a schematic diagram illustrating a network device 400 according to an embodiment of the present disclosure. The network device 400 can be any network node such as, but not limited to, any router, switch, and controller, which are used by the service providers around the world. In accordance with the disclosed embodiments, the network device 102, and provider edge device 104, and network controller 120 in FIG. 1 may be implemented using the network device 400. In an embodiment, the network device 400 can be used to execute the method 300 described in FIG. 3.

In the depicted embodiment, the network device 400 has one or more processor 430 or other processing means (e.g., central processing unit (CPU)) to process instructions. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is communicatively coupled via a system bus with various components of the network device 400 including, but not limited to, receiver units (RX) 420, transmitter units (TX) 440, and memory 460. The processor 430 can be configured to execute instructions stored in the memory 460. Thus, the processor 430 provides a means for performing any computational, comparison, determination, initiation, configuration, or any other action corresponding to the claims when the appropriate instruction is executed by the processor.

In an embodiment, the RX 420 or receiving means is configured to receive data via ingress ports 410. Similarly, the TX 440 or transmitting means is configured to transmit data via egress ports 450. In some embodiments, the network device 400 may connect to one or more bidirectional links. Moreover, at least one of the ingress ports 410 may be integrated with at least one of the egress ports 450. Additionally or alternatively, at least one of the RX 410 may be replaced with at least one transceiver unit. Similarly, at least one of the TX 440 may be replaced with at least one transceiver unit. Further, at least one of the ingress ports 410 may be integrated with at least one of the egress ports 450. Additionally or alternatively, at least one of the ingress ports 410 may be replaced with at least one bi-direction port. Similarly, at least one of the egress ports 450 may be replaced with at least one bi-directional port. Accordingly, in such embodiments, the network device 400 may be configured to transmit and receive data over one or more bidirectional links via bi-directional ports 410 and/or 450.

The memory 460 or data storing means stores instructions and various data. The memory 460 can be any type of or combination of memory components capable of storing data and/or instructions. For example, the memory 460 can include volatile and/or non-volatile memory such as read-only memory (ROM), random access memory (RAM), ternary content-addressable memory (TCAM), and/or static random-access memory (SRAM). The memory 460 can also include one or more disks, tape drives, and solid-state drives. In some embodiments, the memory 460 can be used as an over-flow data storage device to store programs when such programs are selected for execution, and to store instructions and data that are read during program execution. In some embodiments, the memory 460 can be memory that is integrated with the processor 430.

In an embodiment, the memory 460 stores a multi-segment flow spec module 470. The multi-segment flow spec module 470 includes data and executable instructions for implementing the disclosed embodiments. For instance, the multi-segment flow spec module 470 can include instructions for implementing the methods described herein such as, but not limited to, the method 300 described in FIG. 3. The inclusion of the multi-segment flow spec module 470 substantially improves the functionality of the network device 400 by enabling flows to be recognize by testing multiple header fields such as a Layer 2 header field in addition to Layer 3 protocol headers.

Accordingly, the present disclosure provides a multi-segment flow spec that can identify multiple segments at different address types/layers. The different segments use a segment type identifier or label (e.g., AFI) that identifies the layer and the address family in use in each segment. Advantages of the disclosed embodiments include providing a flexible and precise way to indicate what address type and layer is being matched by what part of the multi-segment flow spec module.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A method performed by a network node for identifying flows, the method comprising:
receiving a Border Gateway Protocol (BGP) multi-segment flow specification (spec) comprising an outer flow spec segment and a Tunnel header flow spec segment that defines a plurality of attributes of multiple sequential headers for identifying packets corresponding to a particular packet flow, wherein the multiple sequential headers comprise a first layer header preceding a Tunnel header, and wherein the BGP multi-segment flow spec further comprises an action to perform on the packets corresponding to the particular packet flow;
receiving a packet comprising the multiple sequential headers;
determining whether data contained in the multiple sequential headers of the packet matches the plurality of attributes defined by the BGP multi-segment flow spec; and
processing the packet according to the action specified in the BGP multi-segment flow spec when the data contained in the multiple sequential headers of the packet matches the plurality of attributes of the BGP multi-segment flow spec.

2. The method of claim 1, wherein the first layer header is a Layer 3 protocol header, and wherein BGP multi-segment flow spec further comprises an inner flow spec segment.

3. The method of claim 1, wherein determining whether data contained in the multiple sequential headers of the packet matches the plurality of attributes defined by the BGP multi-segment flow spec comprises:
retrieving a first segment type identifier for a first segment of the BGP multi-segment flow spec;
determining whether the first segment interpreted under the first segment type identifier match a corresponding first header of the packet;
retrieving a second segment type identifier for a second segment of the BGP multi-segment flow spec; and
determining whether the second segment interpreted under the second segment type identifier match a corresponding second header of the packet.

4. The method of claim 1, wherein each segment in the BGP multi-segment flow spec is associated with a segment type identifier.

5. The method of claim 4, wherein the segment type identifier is an Address Family Identifier (AFI).

6. The method of claim 4, wherein the segment type identifier for a segment in the BGP multi-segment flow spec is specified within the segment of the BGP multi-segment flow spec.

7. The method of claim 4, wherein segment type identifiers for segments in the BGP multi-segment flow spec are located at a beginning of the BGP multi-segment flow spec.

8. The method of claim 1, further comprising:
receiving a plurality of BGP flow specs from a flow spec controller, wherein the plurality of BGP flow specs comprises the BGP multi-segment flow spec; and
storing the plurality of BGP flow specs in a data table.

9. The method of claim 8, further comprising iterating the plurality of BGP flow specs in order of precedence to determine whether the packet matches any BGP flow spec in the plurality of BGP flow specs.

10. The method of claim 9, further comprising processing the packet according to a forwarding process when the packet does not match any of the plurality of BGP flow specs.

11. An apparatus comprising:
a memory storing instructions;
one or more processors coupled to the memory, the one or more processors configured to execute the instructions to cause the apparatus to:
receive a Border Gateway Protocol (BGP) multi-segment flow specification (spec) comprising an outer flow spec segment and a Tunnel header flow spec segment that defines a plurality of attributes of multiple sequential headers for identifying packets corresponding to a particular packet flow, wherein the multiple sequential headers comprise a first layer header preceding a Tunnel header, and wherein the BGP multi-segment flow spec further comprises an action to perform on the packets corresponding to the particular packet flow;

receive a packet comprising the multiple sequential headers;

determine whether data contained in the multiple sequential headers of the packet matches the plurality of attributes defined by the BGP multi-segment flow spec; and process the packet according to the action specified in the BGP multi-segment flow spec when the data contained in the multiple sequential headers of the packet matches the plurality of attributes of the BGP multi-segment flow spec.

12. The apparatus of claim 11, wherein the first layer header is a Layer 3 protocol header, and wherein BGP multi-segment flow spec further comprises an inner flow spec segment.

13. The apparatus of claim 11, wherein determining whether data contained in the multiple sequential headers of the packet matches the plurality of attributes defined by the BGP multi-segment flow spec comprises:

retrieving a first segment type identifier for a first segment of the BGP multi-segment flow spec;

determining whether the first segment interpreted under the first segment type identifier match a corresponding first header of the packet;

retrieving a second segment type identifier for a second segment of the BGP multi-segment flow spec; and determining whether the second segment interpreted under the second segment type identifier match a corresponding second header of the packet.

14. The apparatus of claim 11, wherein each segment in the BGP multi-segment flow spec is associated with a segment type identifier.

15. The apparatus of claim 14, wherein the segment type identifier is an Address Family Identifier (AFI).

16. The apparatus of claim 14, wherein the segment type identifier for a segment in the BGP multi-segment flow spec is specified within the segment of the BGP multi-segment flow spec.

17. The apparatus of claim 14, wherein segment type identifiers for segments in the BGP multi-segment flow spec are located at a beginning of the BGP multi-segment flow spec.

18. The apparatus of claim 11, wherein the one or more processors are further configured to receive computer instructions which, when executed, cause the apparatus to:

receive a plurality of BGP flow specs from a flow spec controller, wherein the plurality of BGP flow specs comprises the BGP multi-segment flow spec; and store the plurality of BGP flow specs in a data table.

19. The apparatus of claim 18, wherein the one or more processors are further configured to receive computer instructions which, when executed, cause the apparatus to iterate through the plurality of BGP flow specs in order of precedence to determine whether the packet matches any BGP flow spec in the plurality of BGP flow specs.

20. The apparatus of claim 19, wherein the one or more processors are further configured to receive computer instructions which, when executed, cause the apparatus to process the packet according to a forwarding process when the packet does not match any of the plurality of BGP flow specs.

* * * * *